July 1, 1941.  C. W. STRONG  2,247,590

VALVE

Original Filed Aug. 2, 1939

INVENTOR
CHARLES W. STRONG
BY
James A. Girnau
ATTORNEY

Patented July 1, 1941

2,247,590

UNITED STATES PATENT OFFICE 2,247,590

VALVE

Charles W. Strong, Portland, Oreg.

Substitute for abandoned application Serial No. 288,020, August 2, 1939. This application April 7, 1941, Serial No. 387,284

3 Claims. (Cl. 251—134)

This invention relates to valves of the type generally useful for the control of fluids and suitable for actuation by automatic means. This present application is a substitute for application Serial No. 288,020, filed August 2, 1939.

The principal object of this invention is the provision of such a valve without packing means to seal the mechanical connections between the interior and exterior parts.

A second object is the provision in such a valve of means to provide for the snap-action of the valve from the fully open to the fully closed adjustment.

A third object of this invention is the provision in such a valve of automatic means to compensate the normal wear of the sealing means.

Figure 1:
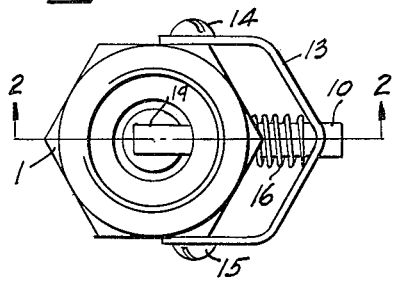
Figure 1 represents a view of the end of the complete valve.
Figure 4:
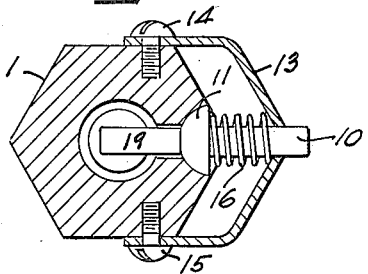
Figure 4 is a section taken on the line 4—4 of Figure 2.
Figure 2:
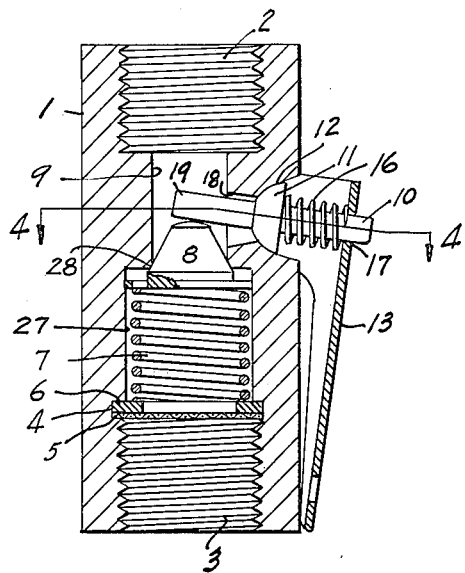
Figure 2 represents a longitudinal diametral section taken on the line 2—2 of Figure 1, particularly showing the position of the parts when the valve is closed.
Figure 3:
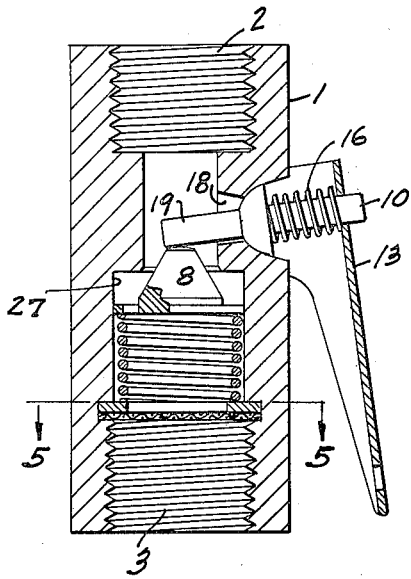
Figure 3 represents a view in longitudinal diametral section of the valve, particularly showing the position of the parts when the valve is open.

Referring now more particularly to the drawing:

The body of the valve 1 is made conveniently of a hexagonal cross section to adapt the same for handling with a wrench and is further bored longitudinally and provided with special features to retain the moving parts. At both ends, pipe threads 2 and 3 are provided. A recess 4 of greater diameter than the pipe thread 3 provides a means in which a filter 5 and snap-ring 6 may be retained. A compression spring 7 bears against the snap-ring 6 and exerts a thrust against the valve 8, to retain the latter in a closed position, to stop the bore 9 communicating with a pipe screwed into the thread 2. A valve lever 10 is formed with a hemispherical portion 11 ground into a seat 12 in the body of the valve and further extends interiorly to contact the valve 8, as shown in Figures 2 and 3.

A control lever 13 is pivotally mounted upon the body of the valve by means of the screws 14 and 15 situated in laterally spaced relationship to the axis, or center of the hemispherical part 11 and in exact alignment therewith in the longitudinal disposition. A compression spring 16 bears against the lever 13 and exerts force against the valve lever 10, slidable through the control lever 13 at 17 to retain the hemispherical part 11 of the valve lever in the seat 12. A longitudinal elongated slot 18, extending interiorly from the hemispherical seat 12, allows of longitudinal oscillation of the extremity 19 and of the valve lever 10 to unseat the valve 8 normally retained in the closed position by the spring 7.

It is to be observed that the control lever 13 and the valve lever 10 are so pivotally mounted with relation to each other, as to provide that the same will be in toggle relationship in a manner to allow of the extension of the spring 16 when the control lever 13 and the valve lever 10 are at either extremity of movement and in the compression of the spring 16, when these parts are in intermediate positions. Thus, if the control lever 13 be moved in a counterclockwise position as viewed in Figure 2 through slightly more than half the full movement, the spring 16 will operate to force the parts through the entire movement to dispose the same in the positions shown in Figure 3.

Figure 5:
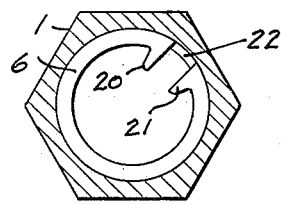
Figure 5 is a section taken on the line 5—5 of Figure 3.

The snap-ring 6 shown in Figure 5 is provided with inwardly extending lugs 20 and 21 to allow of placing the same in the recess 22 by means of long nosed pliers, or other suitable tools. It will be apparent from the drawing that the entire assembly of the complete valve is accomplished by placing this snap-ring 6 and attaching the control lever by means of the two screws 14 and 15.

Figure 6:
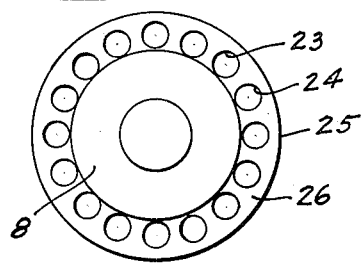
Figure 6 represents on an enlarged scale an end view of the movable valve member as would be viewed in Figure 1.

The valve 8 illustrated in detail in Figure 6 is provided with a series of perforations as 23 and 24 through which fluids may flow toward the valve 8 and seat therefor. The periphery 25 of the flange 26 is slidably fitted within the bore 27 to provide for the accurate presentation of the valve 8 to its seat 28.

It will be apparent that the spring 16 will, in addition to providing for the snap-action of the valve, continuously take up the wear occurring between the hemispherical part 11 and the seat 12 therefor, thus, providing an extremely durable, easy acting and safe valve particularly useful in connection with gas appliances. The end 3 of the valve would, of course, in accordance with good practice be connected to the pressure source.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:

1. A valve comprising, a tubular body formed interiorly with a valve-seat and exteriorly with a pivot-seat forming an aperture in said tubular body, a valve for said valve-seat, a valve lever extending through said aperture and pivotally engaging said pivot-seat, exterior link-means pivotally attached to said body extending to slidably engage the exterior extremity of said valve-lever, and a spring extending between the free end of said link-means and the pivotal engagement of said valve-lever.

2. A valve comprising, a tubular body formed interiorly with a valve-seat and exteriorly with a pivot-seat forming a lateral aperture in said tubular body, a valve for said valve-seat, a valve-lever extending through said aperture and pivotally engaging said pivot-seat, exterior link-means pivotally attached to said body upon a substantially diametral axis, which together with the axis of said pivot-seat is contained in a plane normal to the axis of said body, and a compression spring extending between a pivotal bearing at said pivot-seat and the free end of said link-means.

3. A valve comprising, a tubular body formed interiorly with a valve-seat and exteriorly with a pivot-seat forming a lateral aperture medially of its ends, a valve for said valve seat, a valve-lever extending through said aperture to operate said valve formed with a medially disposed pivotal feature engaging said pivot-seat, exterior link-means pivotally attached to said body upon a substantially diametral axis which together with the axis of said pivot-seat is contained in a plane normal to the axis of said body, the same extending at its free end to slidably embrace the exterior extremity of said valve-lever, and a helical compression spring mounted upon the exterior portion of said valve-lever between the pivotal feature thereof and the free end of said link-means.

CHARLES W. STRONG.